(12) United States Patent
Drouet et al.

(10) Patent No.: US 7,716,527 B2
(45) Date of Patent: May 11, 2010

(54) REPAIR SYSTEM

(75) Inventors: Francois-Xavier Drouet, La Gaude (FR); Vincent Outters, Gattieres (FR)

(73) Assignee: International Business Machines Corporation, Armonk, NY (US)

(*) Notice: Subject to any disclaimer, the term of this patent is extended or adjusted under 35 U.S.C. 154(b) by 653 days.

(21) Appl. No.: 11/268,222

(22) Filed: Nov. 7, 2005

(65) Prior Publication Data

US 2006/0117209 A1    Jun. 1, 2006

(30) Foreign Application Priority Data

Nov. 8, 2004   (EP) ................................. 04300765

(51) Int. Cl.
*G06F 11/00* (2006.01)
(52) U.S. Cl. .......................... 714/27; 726/24
(58) Field of Classification Search ........................ None
See application file for complete search history.

(56) References Cited

U.S. PATENT DOCUMENTS

| | | | |
|---|---|---|---|
| 5,960,170 A * | 9/1999 | Chen et al. ..................... 714/38 |
| 6,240,530 B1 * | 5/2001 | Togawa ......................... 714/38 |
| 7,010,696 B1 * | 3/2006 | Cambridge et al. .......... 713/188 |
| 7,016,062 B2 * | 3/2006 | Ishizuka ...................... 358/1.15 |
| 7,188,369 B2 * | 3/2007 | Ho et al. ........................ 726/24 |
| 7,302,706 B1 * | 11/2007 | Hicks et al. ................... 726/24 |
| 7,353,428 B2 * | 4/2008 | Cheston et al. ................ 714/38 |
| 2002/0147915 A1 * | 10/2002 | Chefalas et al. ............. 713/188 |
| 2002/0199116 A1 * | 12/2002 | Hoene et al. ................. 713/201 |
| 2003/0023866 A1 * | 1/2003 | Hinchliffe et al. ........... 713/200 |
| 2005/0138159 A1 * | 6/2005 | Challener et al. ........... 709/223 |

* cited by examiner

*Primary Examiner*—Bryce P Bonzo
(74) *Attorney, Agent, or Firm*—Andrea Bauer; Hoffman Warnick LLC

(57) ABSTRACT

A repair system is disclosed comprising: a server having a repair manager; a client device having a repair agent; and a network, wherein the server and the client device are connected to the network. The repair agent, in response to a repair signal, is operable to restrict communication of the client device on the network to the repair manager, and the repair manager is operable to provide a repair application. The repair system is enabled to correct actual or potential problems including software viruses and trojans, and spam messages. Diagnosis and repairs can be carried out in response to a deleterious detection system or through user input to the device. The repair agent requires only limited system resources and therefore it particularly applicable to mobile devices where system resources are at a premium.

16 Claims, 1 Drawing Sheet

REPAIR SYSTEM

TECHNICAL FIELD

The present invention relates to a repair system and particularly, but not exclusively, to an autonomic security and repair system for use with wireless devices.

BACKGROUND

Security in networked systems is extremely important with viruses and other malicious code continually on the increase. Wireless connection to networks is also on the increase as devices become smaller and more mobile and infrastructure costs, such as wiring, can be reduced. If a device is to be connected to a network, such as the Internet, at least one application which can provide security is usually required. Security applications are tasked to identify a problem, or a potential problem, and to prevent or repair any damage to the device as well as preventing further propagation of malicious applications.

In mobile devices especially, security applications require a significant amount of resources in comparison to the devices' system as a whole. Generally, the system is not able to support a fully capable security application, in terms of resource, or requires additional hardware than would otherwise be necessary.

Device management systems are available which enable the installation or reinstallation of an application on a mobile or small device. For example, Tivoli's Device Management System is one example of a system which enables connection to a server from a mobile device to download a new application or replacement application.

SUMMARY OF THE INVENTION

The present invention is directed to a repair method, system, client device, server and computer program.

The present invention provides a repair system comprising:
a server having a repair manager;
a client device having a repair agent; and
a network,
wherein the server and the client device are connected to the network; the repair agent, in response to a repair signal, is operable to restrict communication of the client device on the network to the repair manager; and the repair manager is operable to provide a repair application.

In preferable operation the repair agent, once communication has been restricted on the client device to the repair manager, communicates a repair request to the repair manager. The repair manager, in response to receiving the repair request, provides a diagnostic application to the client device, the diagnostic application providing a diagnostic feedback communication to the repair manager.

The repair manager then selects the repair application depending on the diagnostic feedback. The repair application provides a repair feedback communication to the repair manager, indicating a repair status of the client device.

The repair manager then removes the diagnostic application and the repair application from the client device if the repair status indicates the client device is repaired.

The client device may comprise a deleterious detection means, as part of the repair agent or otherwise, for providing the repair signal. The repair signal may also be provided by a user interface, such as a keyboard or keypad.

The repair manager may then reset the repair agent and deleterious detection means enabling the client device to return to normal operation.

In the context of this invention, an actual or potential security problem constitutes a requirement for repair of the client device. That is, the client device may require to be repaired if there is a potentially deleterious means as well as an actual deleterious means.

BRIEF DESCRIPTION OF THE DRAWINGS

Embodiments of the present invention will now be described with reference to the accompanying drawings, in which.

DETAILED DESCRIPTION OF THE INVENTION

Figure 1:
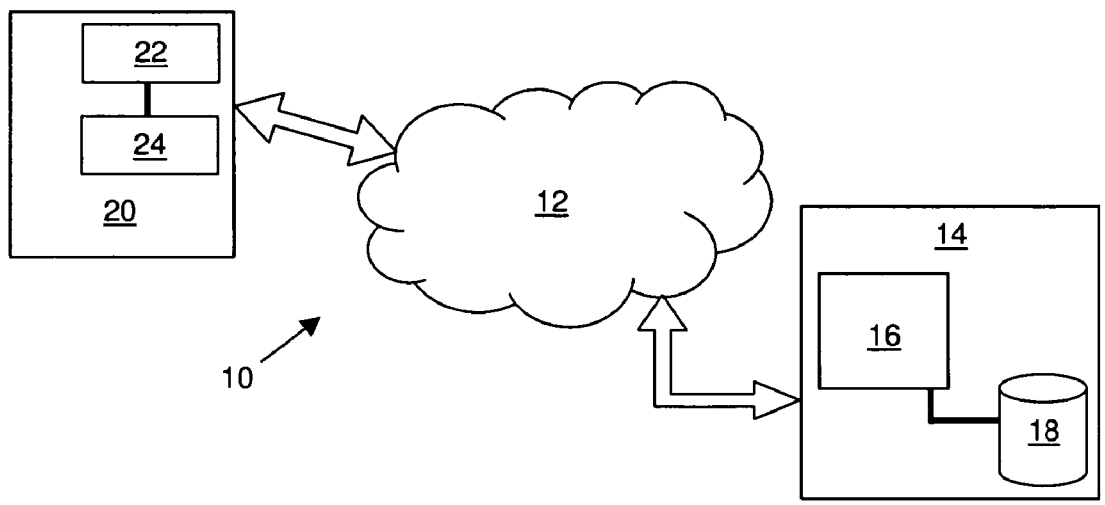
FIG. 1 illustrates a repair system according to the present invention.

Referring to FIG. 1, a repair system 10 comprises a network 12 connecting a server 14, having a repair manager 16 and an application storage means 18, and a client device 20, in this case a mobile telephone, having a repair agent 22 and a deleterious detection means 24.

The deleterious detection means 24 may be an autonomous application or part of another application, such as the repair agent 22.

The network 12 may be the Internet, the Public Switched Telephone Network (PSTN) or any other network of devices. The communication system of the network may be circuit-switched or packet-switched or a combination of both and may involve wire-connected devices as well as wireless devices.

The storage means 18 of the server 14 provides access to a plurality of repair applications and a plurality of diagnostic applications.

Figure 2:
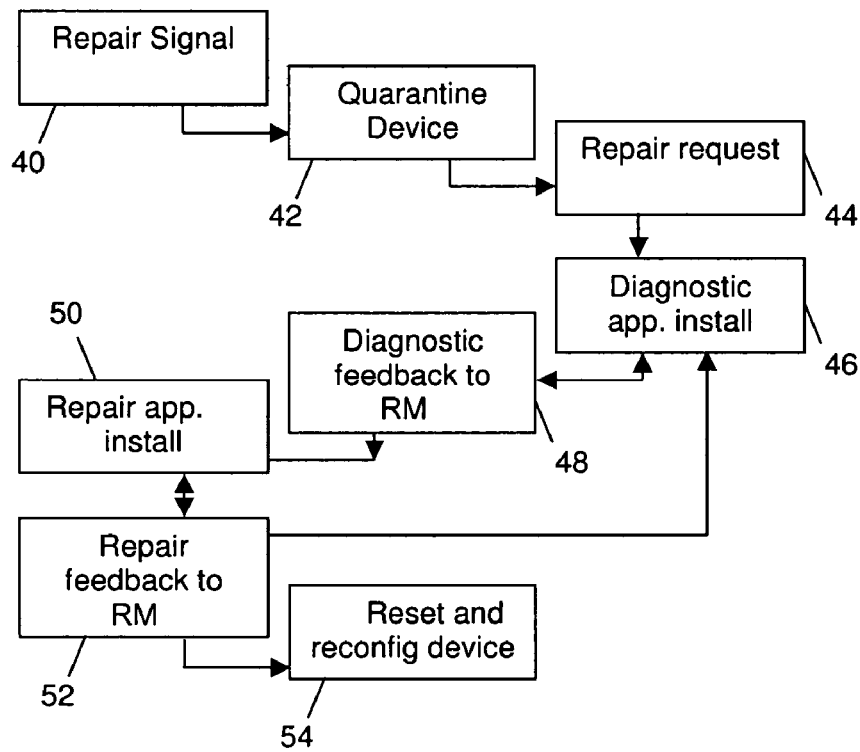
FIG. 2 illustrates a flow diagram of a repair system according to the present invention.

An example of the operation of the autonomic repair system 10 will now be described with reference to FIG. 1 and FIG. 2.

The deleterious detection means 24 monitors the device 20 for malicious software, erroneous software or incorrect device operation. On detection of malicious software, erroneous software or incorrect device operation a repair signal 40 is communicated to the repair agent 22.

The repair agent 22, on receipt of the repair signal 40, executes a quarantine function 42. The quarantine function 42 restricts communication from the device 20 to the server 14. This may be done by deactivating other modes of communication and disabling other ports.

The repair agent 22 communicates a repair request 44 to the repair manager 16 of the server 14. The repair request 44 may contain information about the device 20.

The repair manager 16 selects an appropriate diagnostic application from the storage means 18 based on the device alarm and transmits it to the device 20. The repair agent 22 on receipt of the diagnostic application instigates a diagnostic application execution function 46. The diagnostic application analyses the device 20 and the cause of the repair signal 40. The diagnostic application then provides feedback diagnostic data 48 to the repair manager 16.

The repair manager 16 selects an appropriate repair application based on the feedback diagnostic data 48. The repair agent 22 on receipt of the repair application instigates a repair application execution function 50. The repair application corrects the cause of the warning alarm, if possible, then provides repair feedback data 52 to the repair manager 16.

The repair manager 16 may at this point, and depending on the repair feedback data 52, require further analysis and provide an additional diagnostic application or an alternative repair application as required.

When the repair feedback data 52 has indicated a successful repair, the repair manager instigates a reset function 54. The reset function 54 removes any diagnostic and repair applications still on the device 20 and resets the repair agent 22 and deleterious detection means 24.

The invention is most suited towards mobile devices which do not have the resources to maintain a full security application. Devices which would normally have the resources also benefit from the invention as the server 14 containing the repair manager 16 provides a central point for diagnostic and repair applications. These applications can be maintained and updated centrally on the server 14 as malicious or erroneous software is developed.

The repair system may be enabled to correct actual or potential problems including software viruses, trojans, spam messages, spywares and distributed denial of service.

The repair system may be provided as an optional service in a service provider offer, and particularly in a communication network, providing the service of repairing a client device by restricting the communication network of the client device towards a repair server when a repair request is received from the client device. The repair request may then be analyzed against a diagnostic database to provide across the restricted communication network a repair application to the client device.

Improvements and modifications may be incorporated without departing from the scope of the present invention.

The invention claimed is:

1. A repair system comprising:
   a server having a repair manager;
   a client device comprising a repair agent and a deleterious detection component, wherein the client device is a wireless mobile device, the deleterious detection component monitoring the client device and generating a repair signal upon detection of at least one of malicious software, erroneous software, or incorrect device operation, and communicating the repair signal to the repair agent;
   wherein the server and the client device are connected to a common network; the repair agent, in response to receiving the repair signal generated by the deleterious detection component, is operable to restrict communication of the client device on the network to the repair manager; and, the repair manager is operable to provide a repair application, wherein communication between the client device and the repair manager is restricted at least until the repair application is executed on the client device.

2. A system as claimed in claim 1, wherein the repair agent, once communication has been restricted on the client device to the repair manager, communicates a repair request to the repair manager.

3. A system as claimed in claim 2, wherein the repair manager, in response to receiving the repair request, provides a diagnostic application to the client device, the diagnostic application providing a diagnostic feedback communication to the repair manager.

4. A system as claimed in claim 3, wherein the repair manager selects the repair application depending on the diagnostic feedback.

5. A system as claimed in claim 1, wherein the repair application provides a repair feedback communication, indicating a repair status of the client device.

6. A system as claimed in claims 5, wherein the repair manager removes the diagnostic application and the repair application from the client device if the repair status indicates the client device is repaired, and wherein communication between the client device and the repair manager is restricted at least until removal of the repair application from the client device.

7. A system as claimed in claim 1, wherein the repair signal may be provided by a user interface.

8. A system as claimed in claim 1, wherein the repair manager resets the repair agent and deleterious detection component after the client device has been repaired enabling the client device to return to normal operation.

9. A method of repairing of a client device, the method comprising the steps of:
   providing, on the client device, wherein the client device is a wireless mobile device, a repair agent and a deleterious detection component, the deleterious detection component monitoring the client device, generating a repair signal upon detection of at least one of malicious software, erroneous software, or incorrect device operation, and communicating the repair signal to the repair agent;
   receiving the repair signal at the repair agent;
   restricting, by the repair agent, communication from the client device to a repair manager connected across a network in response to the receipt of the repair signal; and
   repairing the client device through providing a repair application across the network, wherein communication between the client device and the repair manager is restricted at least until the repair application is executed on the client device.

10. A method as claimed in claim 9, further comprising communicating a repair request to the repair manager once communication has been restricted on the client device to the repair manager.

11. A method as claimed in claim 10, further comprising providing a diagnostic application to the client device, from the repair manager, in response to receiving the repair request, the diagnostic application providing a diagnostic feedback communication to the repair manager.

12. A method as claimed in claim 11, further comprising selecting the repair application depending on the diagnostic feedback.

13. A method as claimed in claim 9, further comprising providing a repair feedback communication, from the repair application to the repair manager, indicating a repair status of the client device.

14. A method as claimed in claim 13, further comprising removing the diagnostic application and the repair application from the client device if the repair status indicates the client device is repaired, and wherein communication between the client device and the repair manager is restricted at least until removal of the repair application from the client device.

15. A method as claimed in claim 9, further comprising providing a user interface for instigating the repair signal.

16. A method as claimed in claim 9, further comprising resetting the client device once repair has been completed enabling the client device to return to normal operation.

\* \* \* \* \*